S. F. EMERSON.
Fruit Gatherer.
No. 80,466
Patented July 28, 1868.
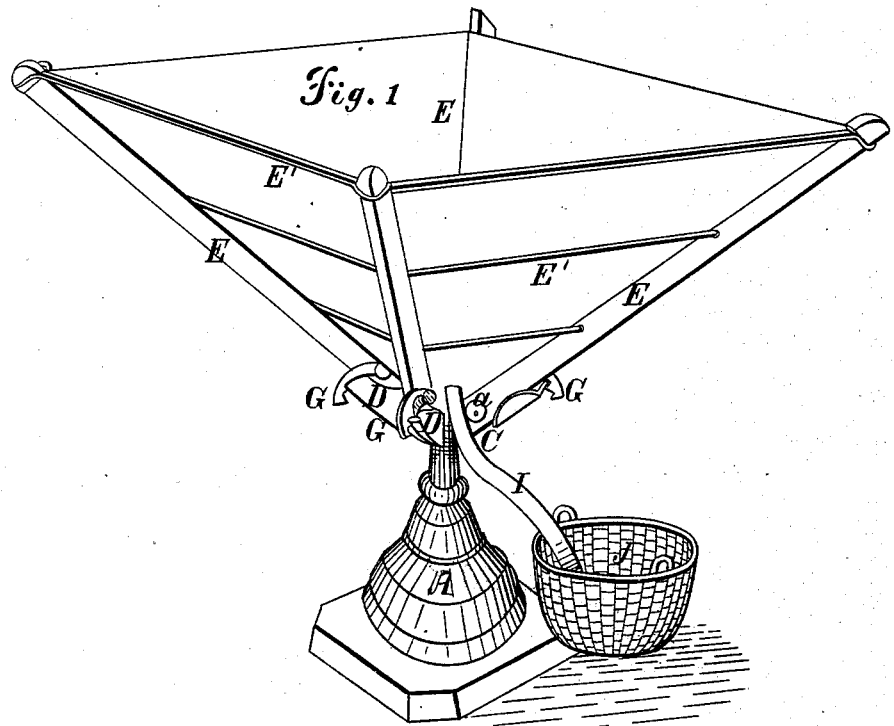
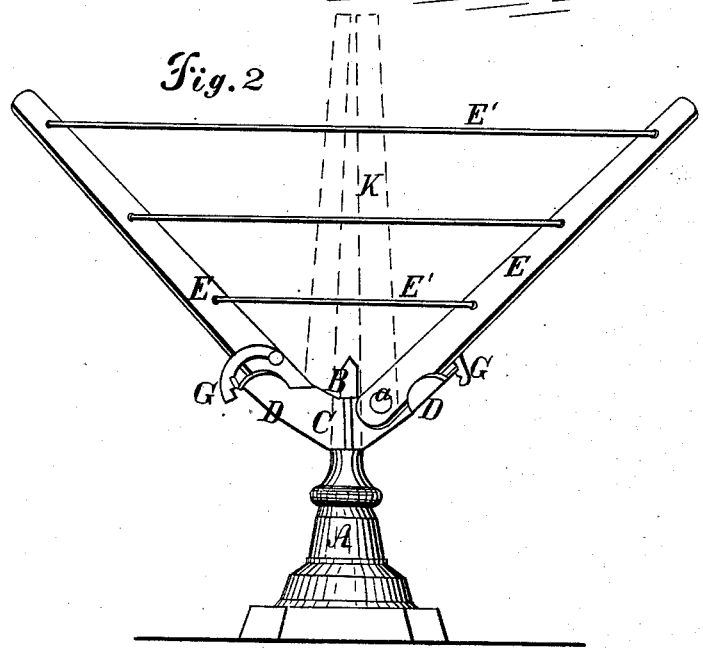
WITNESSES:
INVENTOR.

United States Patent Office.

S. F. EMERSON, OF SEVILLE, OHIO.

Letters Patent No. 80,466, dated July 28, 1868.

IMPROVEMENT IN FRUIT-FRAMES.

*The Schedule referred to in these Letters Patent and making part of the same.*

TO ALL WHOM IT MAY CONCERN:

Be it known that I, S. F. EMERSON, of Seville, in the county of Medina, and State of Ohio, have invented certain new and useful Improvements in Fruit-Frames, &c.; and I do hereby declare that the following is a full and complete description of the same, reference being had to the accompanying drawings, making a part of this specification, in which—

Figure 1 is a perspective view.
Figure 2 is a side view.
Like letters of reference refer to like parts in the views.

My improvement relates to a fruit-frame, so constructed and arranged that it can be used as a receiver for fruit when first gathered, by means of which the fruit is neither bruised nor jammed, and also for drying fruit, and for other purposes, as hereinafter described.

A represents a standard, on the top of which is secured the spindle B. This spindle can be made of any desired length, so that the frame can be raised or lowered, as the nature of the case may require.

Over this spindle is placed the revolving head C, provided with arms D. These arms form sockets or holders, as shown, and receive the arms E, one end of which is pivoted at $a$ to the arms D, the arms E, as stated, resting in the sockets formed by the arms D. The arms E are connected together by cords E', passing from one to the other, as represented.

G G are dogs or pawls, pivoted to the arms E, that catch over the end of the sockets, thus keeping the arms in place when the frame is thrown open. These dogs or pawls are provided with two or more teeth, so that the tension of the cords may be more or less, as desired.

When the frame is thrown open, a bag or lining, F, made to fit the inside of the frame, is then spread over, the cords being attached to the ends of the arms by means of loops, a tube, I, leading from the under side to a basket or receptacle, J, below.

In gathering fruit, the frame can be set near or under the tree from which the fruit is to be taken, and the said frame raised up on the spindle as high as may be desired. When the fruit is picked, it is thrown or placed in the said frame, and, by the elasticity of the lining, the fruit will not be bruised by the fall, but will roll down into the centre, and pass through the tube into the basket, from whence it can be removed as desired. By this means the fruit is not bruised or jammed, by being dropped into a basket or to the ground, and, when picked in this way, it is whole and perfect.

If it is wished to use the frame for drying fruit, the cloth can be removed, and the fruit hung on the cords referred to.

This frame can be used not only for drying fruit, but any article can be dried, such as clothes, garments, &c., either in or out of the house.

When the frame is not in use, the pawls can be released, and the arms folded up, as indicated by the dotted lines K, fig. 2, thus taking up very little room, and it is also convenient in storage or transportation.

This frame can be made of any size, either large or small, as may be desired, and can be folded up, as stated, without regard to size, the arms being held in place, and prevented from falling, by means of the dogs or pawls G.

What I claim as my improvement, and desire to secure by Letters Patent, is—

1. The covering or bag F and tube I, in combination with the adjustable arms E, substantially as and for the purpose set forth.

2. The standard A, head C, in combination with the arms D E, dogs G, and cords E, substantially as and for the purpose set forth.

S. F. EMERSON.

Witnesses:
  W. H. BURRIDGE,
  J. HOLMES.